United States Patent [19]

Rice et al.

[11] Patent Number: 4,646,605
[45] Date of Patent: Mar. 3, 1987

[54] PRECISION SAW WITH VARIABLE SPEED DRIVE

[75] Inventors: Verle L. Rice; Robert P. Rafferty; Richard A. Keener, all of Cass County, Mo.

[73] Assignee: R. B. Industries, Inc., Pleasant Hill, Mo.

[21] Appl. No.: 769,014

[22] Filed: Aug. 26, 1985

[51] Int. Cl.⁴ ............................................. B27B 19/06
[52] U.S. Cl. ........................................ 83/782; 83/783
[58] Field of Search ................. 83/782, 783, 784, 786; 474/39, 46, 23, 29, 30

[56] References Cited

U.S. PATENT DOCUMENTS

| | | | |
|---|---|---|---|
| 220,705 | 10/1879 | Dearborn | 83/782 |
| 2,215,742 | 9/1940 | Reeves | 474/39 |
| 2,257,744 | 10/1941 | Heyer | 474/39 X |
| 2,333,372 | 11/1943 | Green | 83/784 X |
| 3,491,608 | 1/1970 | Trofimov | 474/39 |
| 4,088,036 | 5/1978 | Hillman | 474/39 X |
| 4,503,742 | 3/1985 | Sutton | 83/783 X |

Primary Examiner—Frank T. Yost
Attorney, Agent, or Firm—Kokjer, Kircher, Bradley, Wharton, Bowman & Johnson

[57] ABSTRACT

A precision woodworking saw having a variable speed drive mechanism which drives a saw blade carried on a reciprocating C arm. An electric motor has a drive shaft carrying a split drive pulley which drives a split driven pulley through a V-belt. The driven pulley is mounted on a driven shaft which reciprocates the C arm through an eccentric drive arm. The pulley sections of the split pulleys are movable toward and away from one another to vary the pitch of each pulley and its effective diameter. An adjustment knob can be turned to adjust both pulleys simultaneously to vary the speed ratio between the driven shaft and drive shaft as desired to control the speed at which the saw blade is driven.

3 Claims, 5 Drawing Figures

PRECISION SAW WITH VARIABLE SPEED DRIVE

BACKGROUND AND SUMMARY OF THE INVENTION

This invention relates generally to power operated saws and deals more particularly with a precision woodworking saw having a variable speed drive system for transmitting power to the saw blade.

U.S. Pat. No. 4,503,742 discloses a precision saw which is particularly useful in the production of woodwork having various ornamental patterns and other intricate shapes. In the operation of the saw, some of the cuts which are to be made require relatively fast movement of the saw blade, while other cuts can be made more desirably with the saw blade set at a lower speed. Accordingly, it is desirable for the speed at which the saw blade is reciprocated to be adjustable.

Electronic devices are usually provided on saws of this type to control the speed of the blade. Although electronic speed controllers function well in many applications, they are not particularly well suited for use on reciprocating saws. Because of their relatively high cost, electronic devices add significantly to the overall cost of the saw. Also, the reciprocating action of the saw can create noticeable vibration which can damage electronic components and destroy electrical connections. Significant costs are encountered in repairing or replacing electronic speed control devices that are damaged as a result of vibrational forces. In addition, the entire saw must be taken out of production while the repair of a damaged speed controller or installation of a new speed controller is taking place. The downtime of the machine creates delays that can be costly in terms of production losses.

The present invention is directed to a precision saw which is equipped with a mechanical variable speed drive arrangement that is less expensive and more reliable and durable than the speed controllers that have been used in the past in reciprocating arm saws.

It is an important object of the invention to provide a precision woodworking saw having a variable speed drive mechanism that is constructed to withstand vibration of the saw without significant adverse effects. The mechanical components which are used in the drive system are better able to tolerate vibrational forces than the more delicate electronic components that are used in electronic drive systems and controllers.

Another object of the invention is to provide a precision saw having a variable speed drive mechanism which permits the speed of a reciprocating saw blade to be adjusted in a continuous manner over a wide range of speeds. Due to the use of split pulleys in the drive system, the speed ratio between the drive shaft and driven shaft can be adjusted continuously and is not restricted to discrete steps as are some types of drive systems.

A further object of the invention is to provide a precision saw in which the variable speed drive mechanism has a compact construction and is well suited to be incorporated in existing saw designs.

An additional object of the invention is to provide a precision saw in which the variable speed drive can be quickly and conveniently adjusted to set the desired speed of the saw blade. The speed adjustment requires only the turning of a knob, and the knob is mounted at a conveniently accessible location on the saw where it can be easily reached and adjusted to vary the speed.

Yet another object of the invention is to provide, in a precision saw of the character described, a variable speed drive mechanism which is highly durable and reliable and which operates accurately to allow the speed to be finely adjusted.

A still further object of the invention is to provide a precision saw in which the variable speed drive mechanism is simple and economical to construct and install.

Other and further objects of the invention, together with the features of novelty appurtenant thereto, will appear in the course of the following description.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
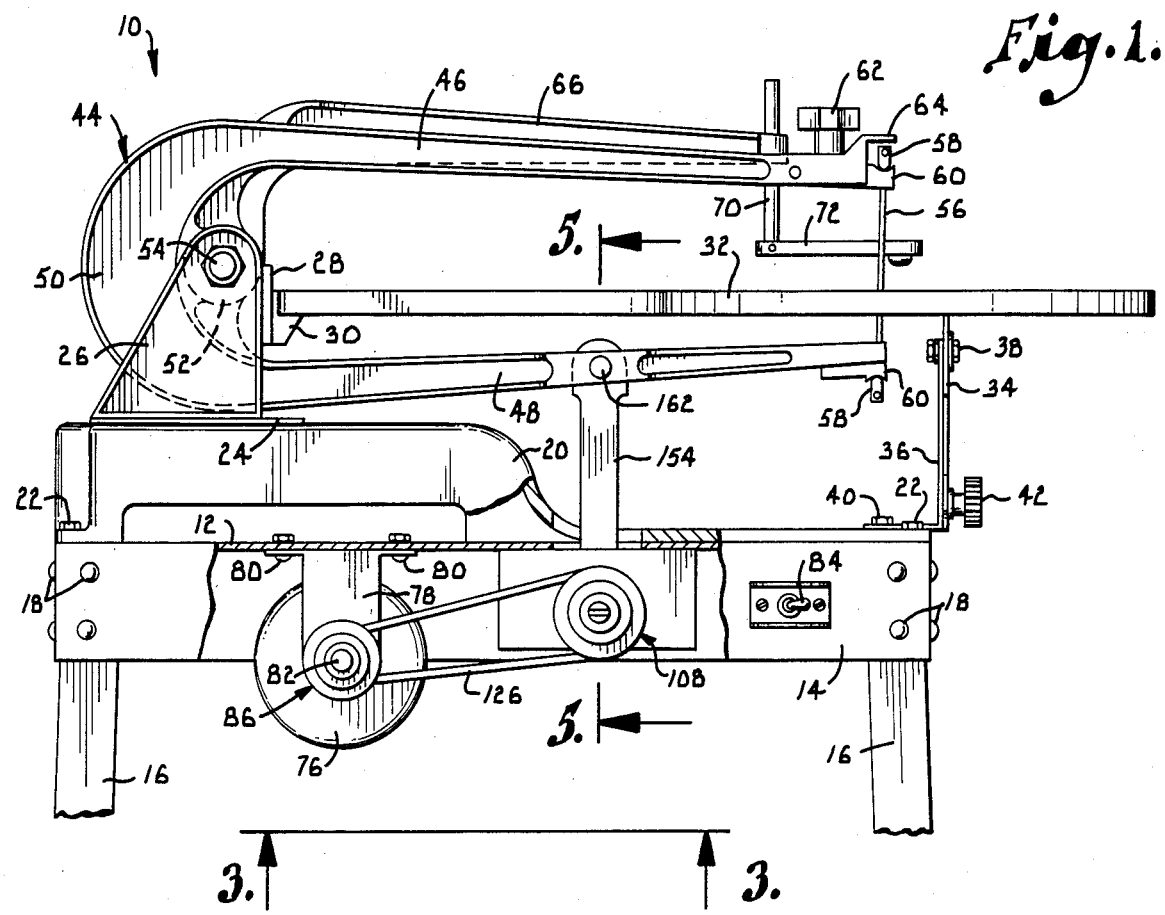
FIG. 1 is a side elevational view of a precision woodworking saw which is equipped with a variable speed drive mechanism constructed according to a preferred embodiment of the present invention, with portions broken away and shown in section for illustrative purposes.
Figure 2:
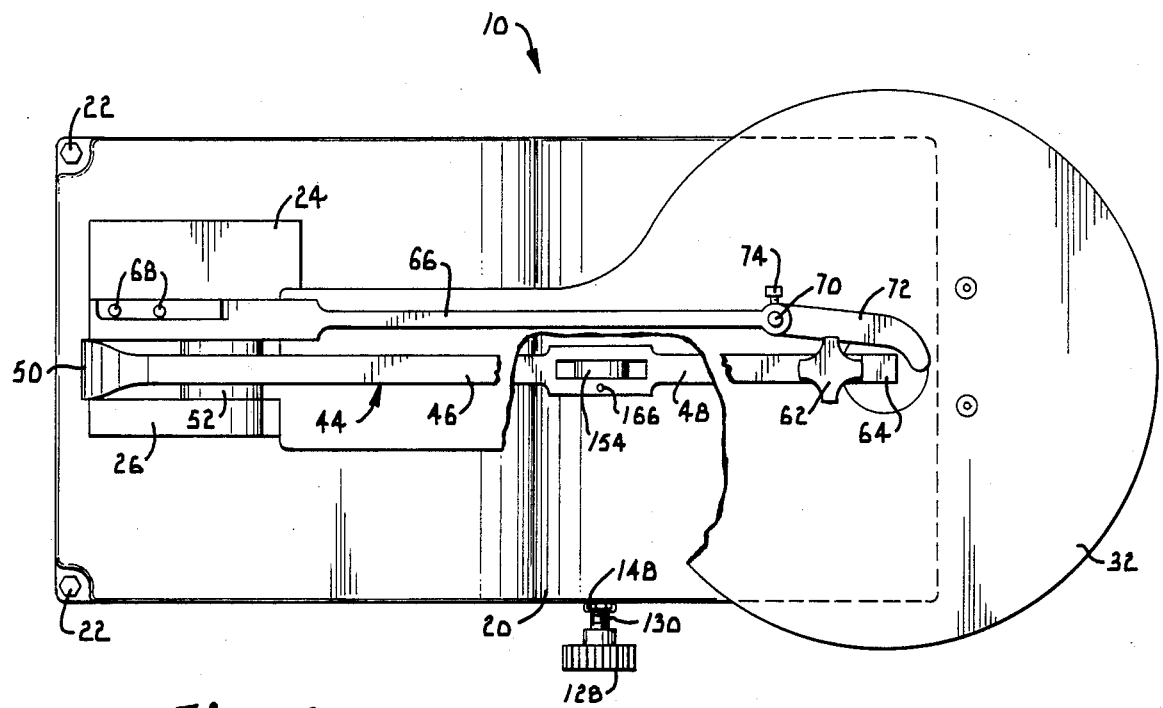
FIG. 2 is a top plan view of the saw shown in FIG. 1, with a portion of the saw table broken away for illustrative purposes.

Referring now to the drawings in more detail and initially to FIGS. 1 and 2, numeral 10 generally designates a precision woodworking saw of the type disclosed in U.S. Pat. No. 4,503,742 which issued on Mar. 12, 1985 to Bill E. Sutton and which is incorporated herein by reference. The operating components of saw 10 are suported on a frame which includes a horizontal panel 12 having downturned flanges 14 on its edge portions. Four legs 16 which may be formed by angle members are secured to the flanges 14 by suitable fasteners 18. A platform 20 is secured on top of panel 12 by bolts 22 or other fasteners.

The back portion of the platform 20 is raised and receives on its top surface a mounting plate 24 from which a pair of upstanding brackets 26 extend. A horizontal cross brace 28 extends between brackets 26. A mounting tab 30 is formed on the back end of a table 32 having a flat surface for supporting work. Tab 30 is pivoted to brace 28 by a horizontal pivot pin (not shown). The main work supporting surface of table 32 is generally circular, and the table also includes a narrower neck portion which carries the mounting tab 30.

A bracket plate 34 is secured to the underside of the work supporting portion of table 32 and is pivotally connected with another bracket plate 36 by a pivot connection 38. Bracket 36 is connected with the front portion of platform 20 by a bolt 40. The pivot connection 38 is aligned with the pivot pin (not shown) which connects the mounting tab 30 with the cross brace 28, thereby establishing a horizontal axis about which table 32 can be tilted. An adjustment knob 42 can be tightened to lock brackets 34 and 36 against one another in order to set the tilt angle of table 32.

A reciprocating C member 44 includes upper and lower arms 46 and 48 connected with one another by a curved bight portion 50. A barrel 52 projects forwardly from the center of the bight portion 50 and is fitted between the two mounting brackets 26 and pivoted thereto by a horizontal pivot connection 54. The upper arm 46 is located above table 32, while the lower arm 42 extends below the table.

A saw blade 56 extends between a pair of blade holders 58 which are received by seats 60 carried on the free ends of the arms 46 and 48. The blade holders 58 have rounded tips which fit in rounded grooves formed in the seats 60 in order to permit the blade holders to rock as arms 46 and 48 are reciprocated up and down during operation of the saw. The saw blade 56 extends through an opening formed in table 32. A knob 62 cooperates with a keeper 64 in order to permit the tension of the saw blade 56 to be adjusted.

The back end of an elongated arm 66 is secured by bolts 68 to the top of one of the mounting brackets 26. Arm 66 is generally horizontal and extends to one side of the upper arm 46. At its forward end, arm 66 receives a vertical rod 70 which carries on its lower end an adjustable foot 72 used to steady the work that is being fed to the saw blade 56. An adjustable knob 74 can be tightened against rod 70 in order to lock the foot 72 in place.

As thus far described, the saw 10 is constructed in the same manner as the saw disclosed in U.S. Pat. No. 4,503,742 to which reference may be made for additional details of the saw construction.

Figure 3:
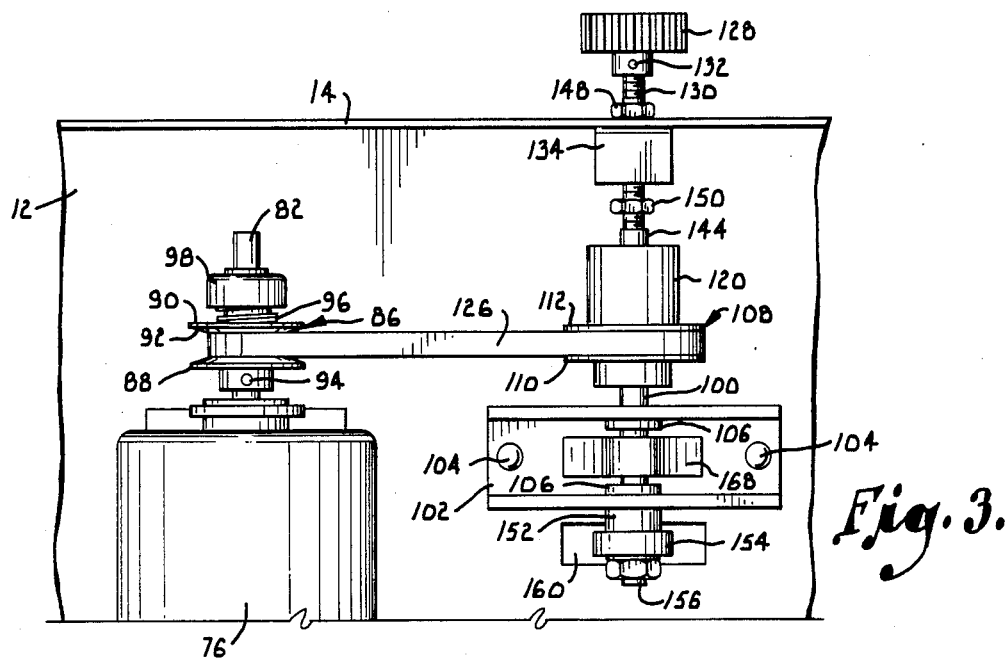
FIG. 3 is a fragmentary bottom plan view on an enlarged scale taken generally along line 3—3 of FIG. 1 in the direction of the arrows, with the components of the variable speed drive mechanism adjusted to drive the reciprocating saw blade at its minimum operating speed.
Figure 4:
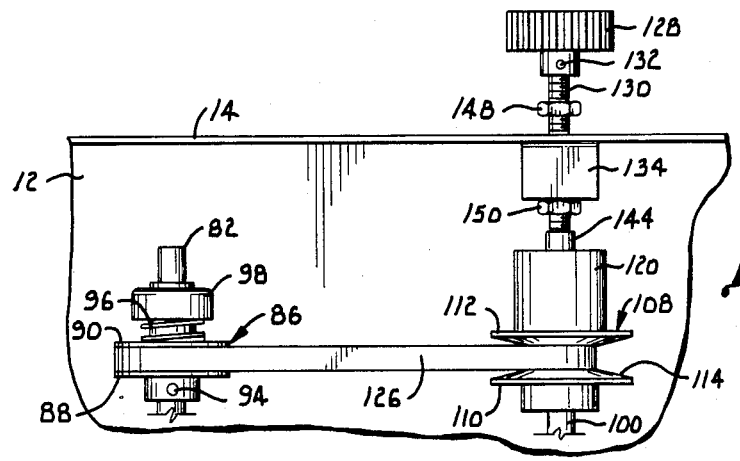
FIG. 4 is a fragmentary bottom plan view similar to FIG. 3 but showing the components of the drive mechanism adjusted to drive the saw blade at its maximum operating speed.

In accordance with the present invention, a variable speed drive mechanism for effecting reciprocation of the saw blade 56 at various speeds is provided. The drive mechanism includes a single speed electric motor 76 which is mounted to the underside of panel 12 by mounting brackets 78 which are secured to panel 12 by bolts 80. Referring additionally to FIGS. 3 and 4, motor 76 has a drive shaft 82 which is rotatably driven when the motor is activated. An on/off switch 84 (see FIG. 1) activates and deactivates the motor and is mounted on one of the side flanges 14 of the frame.

A split drive pulley 86 is mounted on the drive shaft 82 and includes two pulley sections 88 and 90 which cooperate to present a V-shaped groove 92 in the periphery of pulley 86. Pulley section 88 is rigidly secured on shaft 82 by a set screw 94. The other pulley section 90 is keyed to rotate with pulley section 88 but is mounted to slide actually on shaft 82 toward and away from pulley section 88. A compression spring 96 is coiled around shaft 82 and engages pulley section 90 at one end and a spring retainer 98 at the other end. The compressive force applied by spring 96 continuously urges pulley section 90 toward the other pulley section 88.

The variable speed drive mechanism includes a driven shaft 100 which is parallel to the drive shaft 82. A U-shaped bracket 102 is secured to the underside of panel 12 by fasteners 104. The flanges of bracket 102 are provided with bearings 104 which support shaft 100 for rotation. Collars 106 are secured on shaft 100 to prevent it from moving axially relative to the bracket 102.

Figure 5:
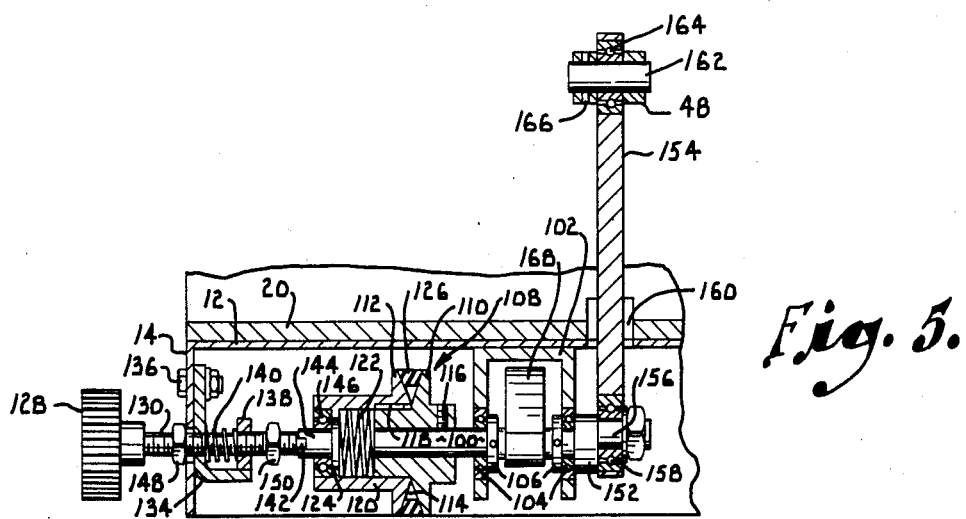
FIG. 5 is a fragmentary sectional view on an enlarged scale taken generally along line 5—5 of FIG. 1 in the direction of the arrows.

A driven pulley 108 is mounted on the driven shaft 100 and has a split construction similar to that of the drive pulley 86. Pulley 108 includes a pair of pulley sections 110 and 112 which cooperate to present a V-shaped groove 114 in the periphery of pulley 108. As shown in Fig. 5, a set screw 116 rigidly secures pulley section 110 on shaft 100. A spline 118 connects pulley section 112 to pulley section 110 for rotation therewith while at the same time permitting pulley section 112 to move toward and away from pulley section 110 along the axis of shaft 100.

With continued reference to FIG. 5 in particular, the movable pulley section 112 has a barrel portion 120 which contains a compression spring 122. The spring 122 bears at one end against pulley section 110 and at the other end against an anular lip 124 which projects inwardly from the barrel portion 120 of the movable pulley section 112. The compressive force applied by spring 122 continuously urges pulley section 112 away from pulley section 110.

Power is transmitted from the drive shaft 82 to the driven shaft 100 by an endless flexible V-belt 126. The V-belt 126 is drawn tightly around the drive pulley 86 and the driven pulley 108 and fits closely in the V-grooves 92 and 114 of the pulleys.

An adjustment mechanism is provided for adjusting the width of groove 114. The adjustment mechanism includes an adjustment knob 128 which is secured on the end of a threaded shaft 130 by a set screw 132 (see FIGS. 3 and 4). Shaft 130 extends through the side flange 14 and through an L-shaped bracket 134 which is bolted at 136 to the inside surface of flange 14. Shaft 130 is threaded through a square nut 138 having its lower edge seated on the flat bottom flange of bracket 134. A compression spring 140 is coiled around shaft 130 and acts at its opposite ends against bracket 134 and nut 138.

Shaft 130 is axially aligned with the driven shaft 100 and is provided on its end with a key 142 which fits closely in a mating slot formed in the end of a stub shaft 144. A bearing 146 provides rotative support for barrel 120 and allows the barrel to rotate relative to the stub shaft 144.

A pair of lock nuts 148 and 150 are threaded onto shaft 130 to provide stops which establish limits for the threaded extension and retraction of shat 130. When shaft 130 is fully extended into flange 14 to the position shown in FIG. 5, the V-groove 114 of pulley 108 is at its minimum width, and further extension of shaft 130 is prevented by engagement of nut 148 with the outside surface of flange 14. Conversely, when shaft 130 is fully retracted out of flange 14, it is in the position of FIG. 4 and groove 114 is then at its maximum width with nut 150 engaging nut 138 to prevent further outward movement of the threaded shaft.

The end of the driven shaft 100 carries a wheel 152 which is eccentrically pinned to a generally vertical drive arm 154. A pin 156 extends from wheel 152 at an off center location thereon and is received in a bearing 158 fitted on the lower end of arm 154. Arm 154 extends upwardly through an opening 160 formed in panel 12 and platform 20. The top end of arm 154 is fitted in a slot formed in arm 48 and is pivotally pinned to arm 48 by a horizontal pivot pin 162. The top end of arm 154 is provided with a bearing 164 which receives pin 162. A retaining pin 166 secures pin 162 to arm 48. A counterbalance 168 is mounted on shaft 100 to assure smooth operation of the eccentric drive arm 154.

In operation of the saw, motor 76 is turned on and off by switch 84 to activate and deactivate the saw. When the motor is turned on, it rotates the drive shaft 82, and the driven shaft 100 is rotated by the driving connection established by pulleys 86 and 108 and the drive belt 126. Rotation of the driven shaft 100 moves the drive arm 150 up and down to its eccentric connection with wheel 152. The drive arm 154 in turn reciprocates arms 46 and 48 up and down to effect reciprocating sawing motion of the saw blade 56.

The speed at which the saw blade 56 is driven is determined by the speed ratio between shafts 82 and 100 which in turn is determined by the effective diameters of the pulleys 86 and 108. When knob 128 is turned to fully advance the adjustment shaft 130 to the position shown in FIGS. 3 and 5, pulley section 112 is moved as close as possible to pulley section 110, and groove 114 then presents its minimum width. The narrow width of groove 114 forces the V-belt 126 outwardly so that it is adjacent to the periphery of pulley 108. The tension of the V-belt then pulls it inwardly against the other pulley 86, and pulley section 90 is forced by the V-belt away from pulley section 88 against the force of spring 96. In this condition, the drive pulley 86 has its minimum effective diameter and the driven pulley 108 has its maximum effective diameter. Consequently, the driven shaft 100 is driven at a much slower speed than the drive shaft 82, and the saw blade 56 is operated at its minimum speed.

When knob 128 is turned to fully retract the threaded adjustment shaft 130 to the position shown in Fig. 4, the shaft 130 is backed away from pulley section 110, and spring 122 then forces pulley section 112 and the stub shaft 144 and bearing 146 away from pulley section 110. This movement of pulley section 112 increases the width of groove 114 to its maximum width, and the action of spring 96 against section 90 of the drive pulley moves pulley section 90 toward pulley section 88 until groove 92 is at its minimum width. The tension of the V-belt 126 maintains it closely in both grooves 92 and 114 at all times to assure that power is efficiently transferred from the drive pulley to the driven pulley.

When groove 92 is at its minimum width and groove 114 is at its maximum width as shown in FIG. 4, the effective diameter of pulley 86 is maximum and the effective diameter of pulley 108 is at its minimum. The speed ratio between shafts 100 and 82 is then at the maximum to drive the saw blade 56 at its maximum speed. Key 142 remains at all times engaged in the slot in the end of stub shaft 144, and shaft 138 thereby acts to limit movement of pulley section 112 away from section 110. The threaded adjustment of shaft 130 varies the position of its end (key 142) to vary the width of groove 114, with spring 96 and the tension of belt 126 acting to correspondingly and simultaneously vary the width of groove 92. The change in the width of groove 92 is equal but opposite to the width variation of groove 114.

By turning the adjustment knob 128, the saw blade 56 can be set to operate at any speed between the minimum and maximum speeds. The speed of the saw blade is continuously variable because the threaded connection of the adjustment shaft 130 permits the speed ratio between shafts 100 and 82 to be adjusted over a continuous range between the minimum and maximum ratios. The lock nuts 148 and 150 provide stops which limit the extension and retraction of shaft 130 to limit the adjustment that can be effected. Preferably, the lock nuts 148 and 150 are of the type which lock in place on the shaft 130 so that vibrational and other forces do not displace the nuts.

Preferably, the adjustment knob 128 is located on the side of the saw which carries the on/off switch 84. In any event, the adjustment knob should be situated at a conveniently accessible location so that the speed adjustment can be quickly and easily made by the operator of the saw. The adjustment of the driven pulley 108 which can be made by turning knob 128 is accompanied by equal and opposite adjustment of the drive pulley 86 under the influence of spring 96 and the tension provided by the drive belt 126. It is therefore apparent that the present invention provides an economical and effective mechanism which permits the speed of the saw blade to be varied simply by turning a conveniently located adjustment knob.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A variable speed drive mechanism for driving a precision saw having a reciprocating saw arm, said mechanism comprising:

a motor driving a rotatable drive shaft;

a first split pulley carried on said drive shaft and including a pair of pulley sections cooperating to present a first V-groove in the first pulley, said pulley sections being mounted on said drive shaft for movement toward and away from one another to vary the width of said first groove;

a driven shaft supported on the saw for rotation;

means for coupling said driven shaft with the saw arm in a manner to effect reciprocation of the saw arm in response to rotation of the driven shaft;

a second split pulley carried on said driven shaft and including a pair of pulley sections cooperating to present a second V-groove in the second pulley, said pulley sections of the second pulley being mounted on said driven shaft for movement toward and away from one another to vary the width of said second groove;

a V-belt drawn tightly around said first and second pulleys and fitting in the V-grooves thereof to rotatively drive said driven shaft when said drive shaft is rotated by the motor;

means for urging the pulley sections of one of said pulleys toward one another;

spring means for urging the pulley sections of the other pulley away from one another;

a threadable shaft having a threaded connection with the saw and being axially extensible and retractable by threaded action upon turning of the threaded shaft, said threaded shaft terminating in a tip having a key and slot connection with said other pulley to limit movement of the pulley sections thereof away from one another; and a knob on said threaded shaft having an accessible location on the saw to facilitate turning of the threaded shaft for adjustment of the widths of said first and second grooves, thereby varying the relative speeds of said drive and driven shafts to vary the speed at which the saw arm is reciprocated.

2. In a precision saw having a pair of generally parallel saw arms holding a saw blade, a driven shaft coupled with the saw arms to reciprocate same about a pivot axis when the driven shaft is rotated and a motor rotating a drive shaft, the improvement comprising:

a drive pulley mounted on the drive shaft and including a pair of pulley sections cooperating to present a first V-groove in the drive pulley, said pulley sections being movable on the drive shaft toward and away from one another to respectively narrow and widen said first groove;

a driven pulley mounted on the driven shaft and including a pair of pulley sections cooperating to present a second V-groove in the driven pulley, said pulley sections of the driven pulley being movable on the driven shaft toward and away from one another to respectively narrow and widen said second groove;

a V-belt drawn tightly around said drive and driven pulleys and fitting closely in the grooves thereof to rotate said driven shaft in response to rotation of said drive shaft;

means for urging said pulley sections of the drive pulley toward one another;

spring means for urging said pulley sections of the driven pulley away from one another;

a threaded shaft having a threaded connection with the saw and being axially extensible and retractable by threaded action when turned in opposite directions, said threaded shaft having a tip on one end and a knob on the other end at an accessible location to facilitate turning of the threaded shaft;

a stub shaft on which the driven pulley is mounted for rotation; and a key and slot connection between said tip of the threaded shaft and said stub shaft, said connection limiting movement of said pulley sections of the driven pulley away from one another, whereby threaded extension and retraction of the threaded shaft adjusts the widths of said first and second grooves to vary the relative speed of the drive and driven shafts.

3. A precision saw comprising:

a rigid frame presenting a table surface for receiving work to be sawn;

a reciprocating member mounted on the frame for reciprocating movement about a pivot axis, said member having a pair of saw arms located respectively above and below the table surface;

a saw blade extending between said saw arms under tension for sawing work fed to the blade while said reciprocating member is reciprocating;

a motor driving a rotatable drive shaft;

a first split pulley carried on said drive shaft and including a pair of pulley sections cooperating to present a first V-groove in the first pulley, said pulley sections being mounted on said drive shaft for movement toward and away from one another to vary the width of said first groove;

a driven shaft supported on the saw for rotation;

means for coupling said driven shaft with said reciprocating member in a manner to reciprocate said member about said pivot axis when the driven shaft is rotated;

a second split pulley carried on said driven shaft and including a pair of pulley sections cooperating to present a second V-groove in the second pulley, said pulley sections of the second pulley being mounted on said driven shaft for movement toward and away from one another to vary the width of said second groove;

a V-belt drawn tightly around said first and second pulleys and fitting in the V-grooves thereof to rotatively drive said driven shaft when said drive shaft is rotated by the motor;

means for urging said pulley sections of the first pulley toward one another;

spring means for urging one pulley section of the second pulley away from the other pulley section of the second pulley;

a bracket on the frame;

a threaded shaft having a threaded connection with said bracket and being extensible and retractable by threaded action upon turning, said threaded shaft having a tip on one end adjacent the second pulley and a knob on the other end to facilitate threaded adjustment of the threaded shaft;

a stub shaft on which said one pulley section of the second pulley is rotatable; and a key and slot connection between said stub shaft and said tip of the threaded shaft, said spring means maintaining said stub shaft against said threaded shaft to maintain said connection established and said connection limiting movement of said one pulley section away from said other pulley section to permit said threaded shaft to be adjusted to adjust the widths of the first and second grooves, thereby varying the relative speeds of the drive and driven shafts.

* * * * *